(12) United States Patent
Cooke

(10) Patent No.: US 7,146,299 B2
(45) Date of Patent: Dec. 5, 2006

(54) ADJUSTABLE SIMULATION VEHICLE CAPABILITIES

(75) Inventor: Steven W. Cooke, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 845 days.

(21) Appl. No.: 10/222,367

(22) Filed: Aug. 16, 2002

(65) Prior Publication Data

US 2004/0033473 A1 Feb. 19, 2004

(51) Int. Cl.
*G06F 9/455* (2006.01)

(52) U.S. Cl. .......................... 703/8; 434/37; 244/191; 244/203

(58) Field of Classification Search ................. 703/2, 703/6, 8; 434/30, 37; 244/191, 203, 3.15; 156/245; 345/419; 446/34
See application file for complete search history.

(56) References Cited

U.S. PATENT DOCUMENTS

| | | | | |
|---|---|---|---|---|
| 4,840,328 A | * | 6/1989 | Sundermeyer | 244/3.15 |
| 5,437,756 A | * | 8/1995 | Carlos et al. | 156/245 |
| 5,607,307 A | * | 3/1997 | Shefchunas | 434/30 |
| 5,689,682 A | * | 11/1997 | Peasley et al. | 703/6 |
| 5,908,176 A | * | 6/1999 | Gilyard | 244/203 |
| 6,189,836 B1 | * | 2/2001 | Gold et al. | 244/191 |
| 6,763,325 B1 | * | 7/2004 | Stone | 703/8 |
| 2002/0055086 A1 | * | 5/2002 | Hodgetts et al. | 434/37 |
| 2002/0128806 A1 | * | 9/2002 | Anderson et al. | 703/2 |
| 2002/0140696 A1 | * | 10/2002 | Futamura et al. | 345/419 |
| 2003/0211806 A1 | * | 11/2003 | Paterson | 446/34 |

OTHER PUBLICATIONS

Hall et al., "X-33 Attitude contro using the XRS-2200 Linear aerospike Engine", American Institute of Aeronautics and Astronautics, 1998.*
Stevenson et al., "Real time aircraft simulation using J-Mass", IEEE 1995.*

* cited by examiner

*Primary Examiner*—Kandasamy Thangavelu
(74) *Attorney, Agent, or Firm*—Lee & Hayes, PLLC

(57) ABSTRACT

The present invention is a system and method for easily adjusting flight characteristics of a simulated aircraft. The system allows a user to adjust commanded pitch, roll or yaw values or steady state frequency response values that are associated with an atmospheric temperature value, an atmospheric dynamic pressure value, aileron position, rudder position, and elevator position.

10 Claims, 5 Drawing Sheets

ADJUSTABLE SIMULATION VEHICLE CAPABILITIES

FIELD OF THE INVENTION

This invention relates generally to simulation vehicles and, more particularly, to adjusting of motion response characteristics of simulation vehicles.

BACKGROUND OF THE INVENTION

Computer simulated aircraft motion is defined by around a dozen aerodynamic coefficients. The aerodynamic coefficients are determined based on the aircraft design and detailed aerodynamic principals. The aerodynamic coefficients are difficult to adjust if one desires to instill different flight characteristics for an aircraft. Many times, an aircraft manufacturer is requested by a customer (e.g., commercial airline or military service) to modify aircraft in order to provide certain flight characteristics.

When this occurs, the aircraft manufacturer would like to provide a simulation aircraft model that accurately reflects desired changes in the flight characteristics. The customer presents the new simulation model to its pilots to determine if this is an acceptable modification change. At present, if the aircraft manufacturer was to change the flight characteristics, it would have to change the coefficients and provide these changed coefficients to the customer in its simulation. When this occurs, the aircraft manufacturer might be giving away its valuable trade secrets or other proprietary or confidential information regarding the flight characteristics of the aircraft.

Also, because of the complexity of the flight characteristics of the aircraft as they relate to the coefficients, only an expert with extensive aerodynamic and mathematical knowledge can effectively change the coefficients. Most likely, a customer or user of the simulation model would not posses the required knowledge and therefore not be able to accurately and efficiently make any desired flight characteristic changes.

Thus, there exists a need to quickly and easily change flight characteristics of flight simulation aircraft models.

SUMMARY OF THE INVENTION

The present invention is a system and method for easily adjusting flight characteristics of a simulated aircraft. The system includes a memory that stores atmospheric temperature values and atmospheric dynamic pressure values and associated frequency response values for pitch, yaw, and roll. The system also includes a component for adjusting at least one of the stored frequency response values for the simulated aircraft. The memory includes a look up table for storing the frequency response values and corresponding atmospheric temperature and atmospheric dynamic pressure values.

The system also includes a memory that stores commanded angle of attack, yaw angle, and roll rate values with an associated atmospheric temperature value, atmospheric dynamic pressure value, and at least one of an aileron, rudder, or elevator position value, and a component for adjusting at least one of the stored commanded angle of attack, yaw angle, or roll rate values for the simulated aircraft. The memory includes a look up table for storing the commanded angle of attack, yaw angle, and roll rate values, associated atmospheric temperature values, atmospheric dynamic pressure values, and aileron, rudder, or elevator position values.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
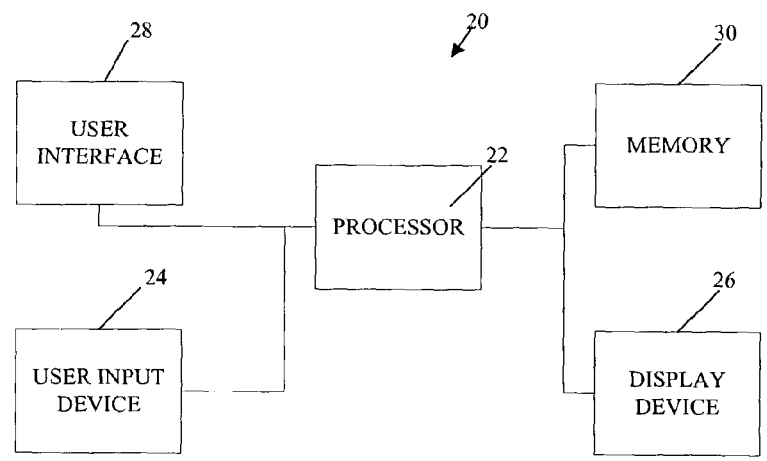
FIG. 1 illustrates a simple block diagram of a simulation system wherein the present invention resides.

FIG. 1 shows an embodiment of a simulation system 20 that includes a processor 22 coupled to a user input device 24, a display device 26, a user interface 28, and memory 30. The processor 22 executes a simulation program that generates display images for presentation on the display device 26 or other simulation information, such as feedback to the user input device 24, in response to user input at the user input device 24 and flight characteristic information that is stored in the memory 30.

In an alternate embodiment of the present invention, a plurality of users using user input devices 24 are coupled to a central server or processor 22 over a network connection (not shown). The central server 22 performs simulation calculations for each entity controlled by a user at a user input device 24 or entities that are not user controlled, such as missiles or projectiles. The user interface 28 allows a user or other operator to manipulate the aircraft flight characteristic values that are stored in the memory 30. The user input device 24 is suitably a stick/yoke and rudder pedals, but could be any other device that can generate aircraft control signals. The user interface 28 is suitably a keyboard or mouse, but could be any user interface device that allows one to access and manipulate the values stored in the memory 30.

The present invention allows one to easily adjust a response the simulation program provides in response to user input. In one embodiment, using the user interface 28 one can adjust commanded values for an angle of attack relative to elevator positions, a yaw angle relative to rudder positions, and roll rate relative to aileron positions. In another embodiment, using the user interface 28 one can adjust the frequency at which the simulation program moves the aircraft from one steady state to another steady state (i.e., the frequency the program moves the simulated aircraft from the last commanded value to the present commanded value). In still another embodiment, using the user interface 28 one can apply factors to the calculation of Thrust, Drag, Lift, or Sideforce to change flight characteristics. The following example illustrates an exemplary process used to update an image or simulation information of a simulated aircraft or update an image generated for a simulated aircraft (i.e., pilot or operator view) and to provide an easy ability to change the flight characteristics of the simulated aircraft.

Figure 2:
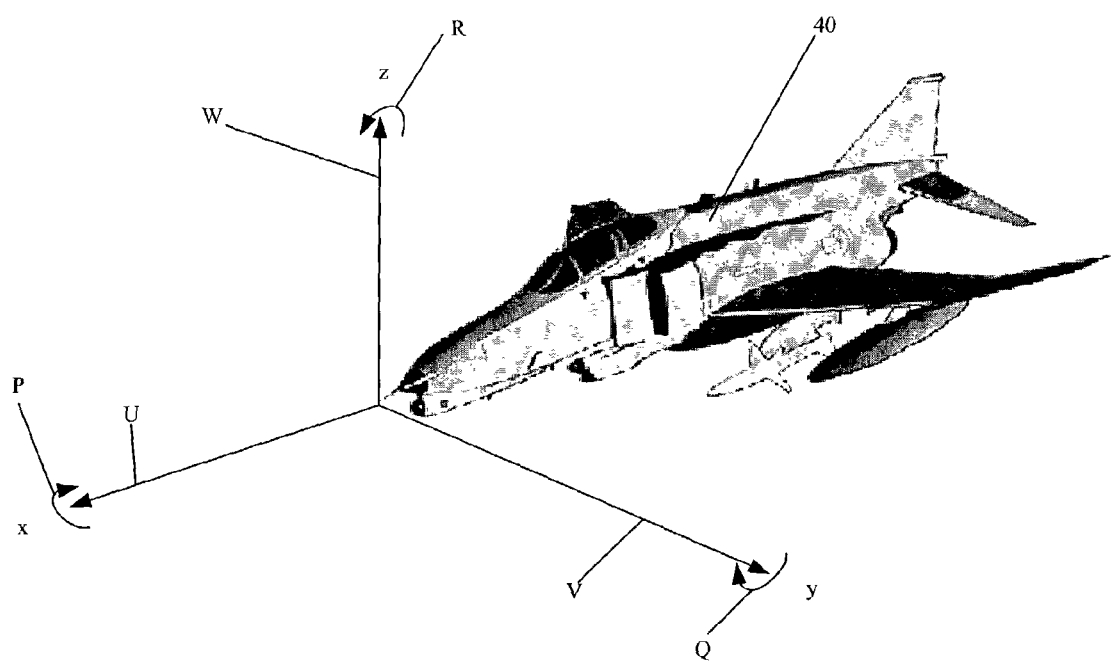
FIG. 2 illustrates the axial velocities and rotational rate vectors around each of the axial directions for an aircraft.
Figure 3:
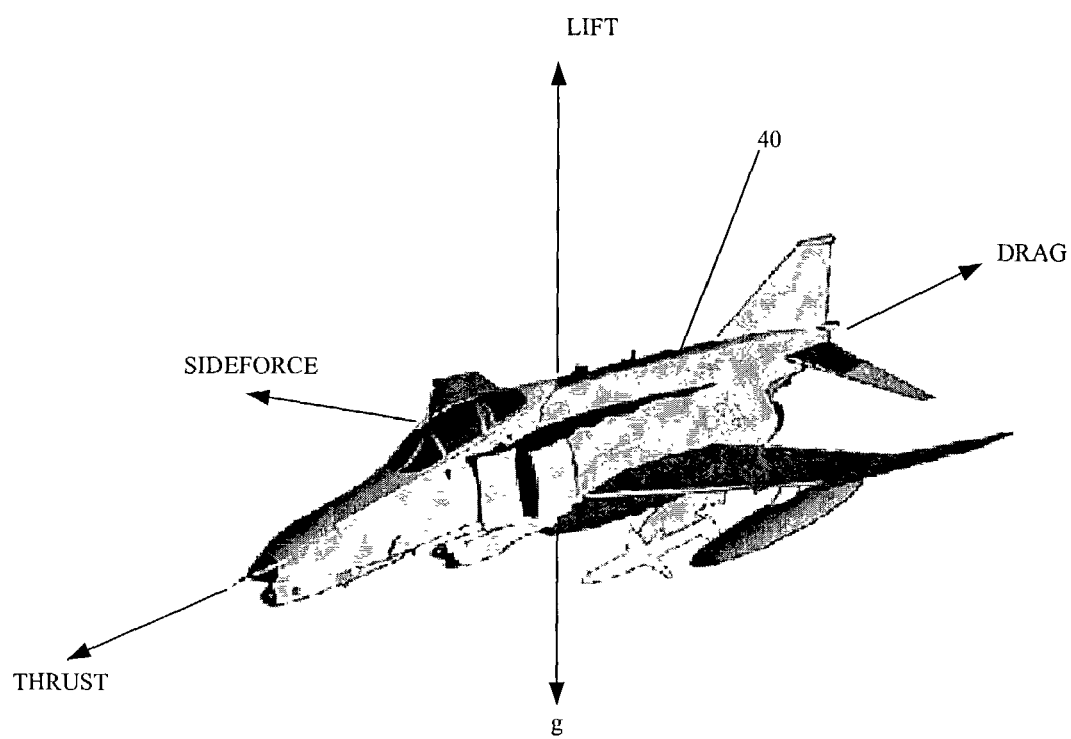
FIG. 3 illustrates lift, thrust, drag, and side forces for the aircraft shown in FIG. 2.

FIGS. 2 and 3 illustrate the forces, axial velocities, and axial rotational rates that are calculated and used by the application program running on the processor 22 in order to determine aircraft position in three-dimensional simulation space. The processor 22 sends the determined aircraft position in three-dimensional simulation space information to a display processor running within the processor 22 for generating an image that is sent to the display device 26. As shown in FIG. 2, an aircraft 40 has a relative coordinate system x, y, z. The origin of the relative coordinate system x, y, z is suitably at an aircraft center of gravity. Along each axial direction are velocity values: U corresponds to the x axis; V corresponds to the y axis; and W corresponds to the z axis. Also, a rotational rate around each axis is determined by the simulation program for updating aircraft position in the simulation. P is the aircraft roll rate about the x axis. Q is the aircraft pitch rate about the y axis. R is the aircraft yaw rate about the z axis. FIG. 3 illustrates the forces on the aircraft 40: Thrust, Drag, Lift, Sideforce, and g (gravity).

Figure 4A:
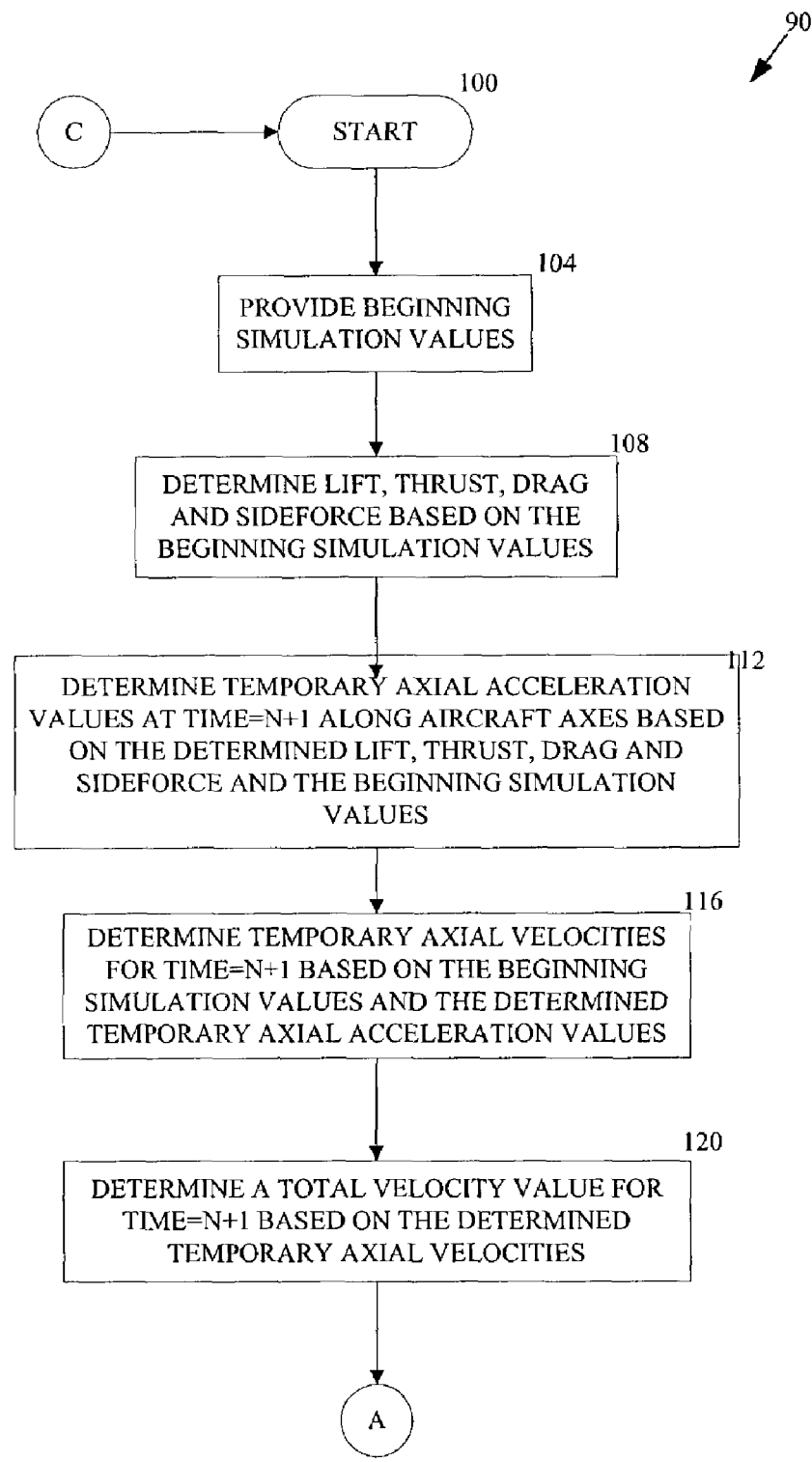
FIGS. 4A–C illustrate a flow diagram for performing the present invention.
Figure 4B:
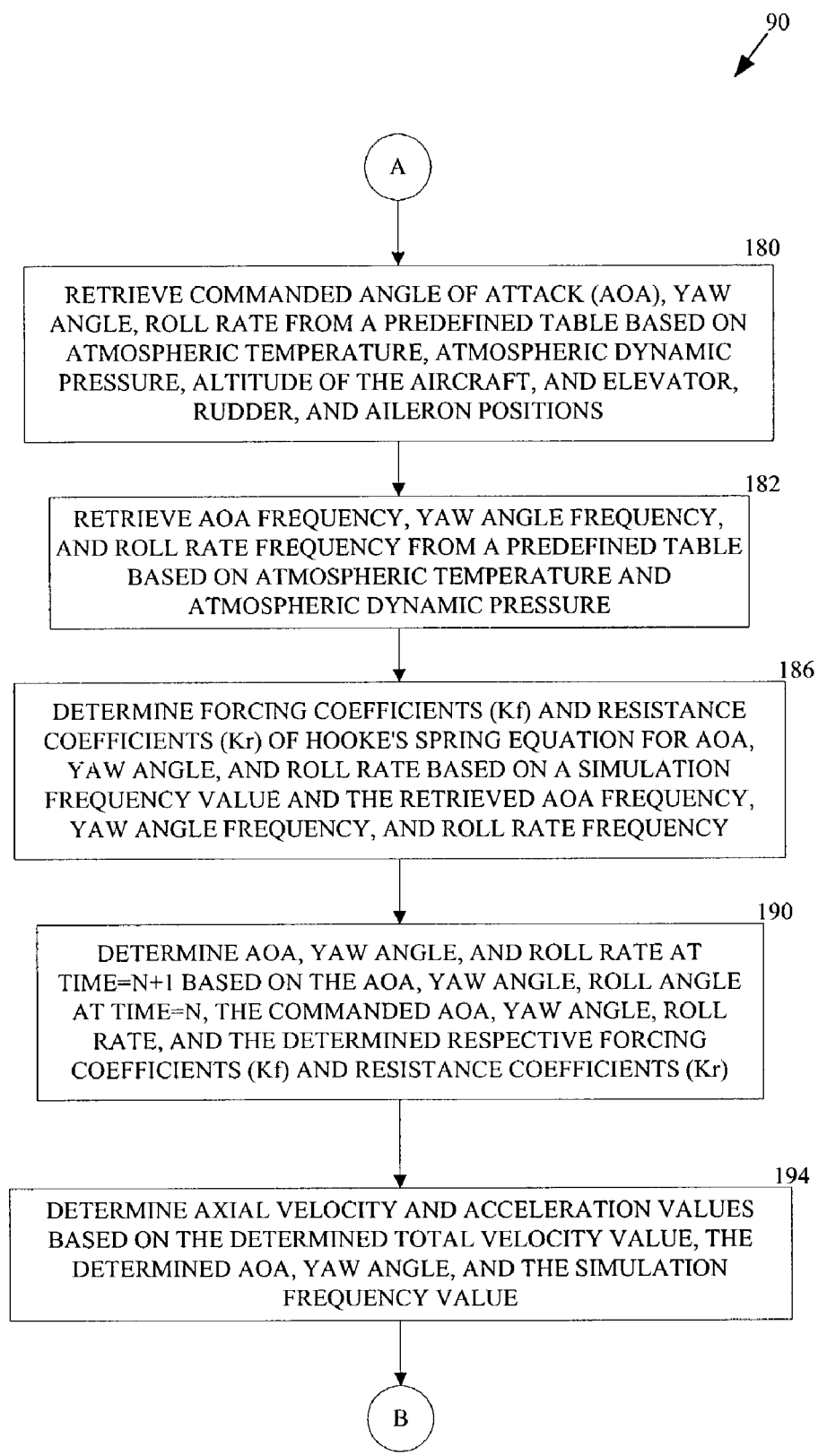

FIGS. 4A–B illustrate a flow diagram that shows a process 90 performed by the system 20 shown in FIG. 1 for providing fast simulation processing with an ability to easily alter flight characteristics. At block 100, the simulation application program running on the processor 22 begins the simulation. At a block 104, a set of beginning simulation values are provided by the processor for an aircraft at time equals n. At the beginning of the simulation processing, n is suitably equal to zero. Next, at a block 108, the processor 22 determines Lift, Thrust, Drag, and Sideforce for the aircraft based on the provided beginning simulation values. As can be appreciated by one skilled in aerodynamics, Lift, Thrust, Drag, and Sideforce determinations are performed by commonly known methods. At a block 112, the processor 22 determines temporary axial acceleration values at time equals n+1 along each of the aircraft axes (FIG. 2) based on the determined Lift, Thrust, Drag, Sideforce, and the beginning simulation values. The following are suitable equations 1–6 that show temporary axial acceleration value determinations:

$$Nx_{n+1} = Thrust - Drag*\cos(\beta_n)*\cos(\alpha_n) - Sideforce*\sin(\beta_n)*\cos(\alpha_n) + Lift*\sin(\alpha_n) \quad (1)$$

$$Ax_{n+1} = Nx_{n+1} - \sin(\theta_n) \quad (2)$$

$$Ny_{n+1} = -Drag*\sin(\beta_n) + Sideforce*\cos(\beta_n) \quad (3)$$

$$Ay_{n+1} = Ny_{n+1} + \cos(\theta_n)*\sin(\phi_n) \quad (4)$$

$$Nz_{n+1} = -Drag*\cos(\beta_n)*\sin(\alpha_n) - Sideforce*\sin(\beta_n)*\sin(\alpha_n) - Lift*\cos(\alpha_n) \quad (5)$$

$$Az_{n+1} = Nz_{n+1} + \cos(\theta_n)*\cos(\phi_n) \quad (6)$$

$Vt_n$=Total Velocity;
$\alpha_n$=Angle of Attack;
$\dot{\alpha}_n$=Angle of Attack rate;
$\beta_n$=Sideslip Angle;
$\dot{\beta}_n$=Sideslip Angle rate;
$U_n = Vt_n*\cos(\alpha_n)*\cos(\beta_n)$;
$V_n = Vt_n*\sin(\beta_n)$;
$W_n = Vt_n*\sin(\alpha_n)*\cos(\beta_n)$;
$P_n, Q_n, R_n$=Roll, Pitch, and Yaw rates w.r.t. body axis;
$\theta_n$=Pitch angle with respect to gravitational axis;
$\phi_n$=Roll angle with respect to gravitational axis;
f=simulation frequency; and
dt =time between n and n+1 (based on simulation frequency).

At a block 116, the processor 22 determines temporary axial velocities at time equals n+1 based on the beginning simulation values and the determined n+1 axial acceleration values. See equations 7–9 below:

$$U_{n+1} = U_n + (Ax_{n+1} + Q_n*W_n - R_n*V_n)*dt \quad (7)$$

$$V_{n+1} = V_n + (Ay_{n+1} + R_n*U_n - P_n*W_n)*dt \quad (8)$$

$$W_{n+1} = W_n + (Az_{n+1} + P_n*V_n - Q_n*U_n)*dt \quad (9)$$

At a block 120, the processor 22 determines a total velocity value at time equals n+1 based on the determined temporary axial velocities. See equation 10 below:

$$Vt_{n+1} = sqrt(U_{n+1}^2 + V_{n+1}^2 + W_{n+1}^2) \quad (10)$$

The process 90 then continues to a block 180 in FIG. 4B. At the block 180, the simulation program retrieves a commanded angle of attack ($\alpha$) from a predefined table stored in the memory 30 based on aircraft elevator position, atmospheric temperature, and atmospheric dynamic pressure. The simulation program retrieves a commanded yaw angle ($\beta$) from a predefined table stored in the memory 30 based on aircraft rudder position, atmospheric temperature, and atmospheric dynamic pressure. The simulation program retrieves a commanded roll rate (P) from a predefined table stored in the memory 30 based on aircraft aileron position, atmospheric temperature, and atmospheric dynamic pressure. Aircraft mach number and altitude can be used if atmospheric temperature and atmospheric dynamic pressure are not provided. At a block 182, an angle of attack frequency, a yaw angle frequency, and a roll rate frequency are retrieved from a table based on atmospheric temperature and the atmospheric dynamic pressure or mach number and altitude.

At a block 186, the simulation application program determines forcing coefficients ($k_f$) and resistance coefficients ($k_r$) for Hook's Spring equation for each of angle of attack, yaw angle, and roll rate based on the simulation frequency and the corresponding angle of attack frequency, yaw frequency, and roll rate frequency. At block 190, the simulation application program determines angle of attack, yaw angle, and roll rate at time n+1 based on the angle of attack, yaw angle, roll rate at time n, the retrieved commanded angle of attack, yaw angle, roll rate, and the determined corresponding coefficients ($k_f, k_r$). See equations 11–19 below:

$$\ddot{\alpha}_{n+1} = (\alpha_{com_{n+1}} - \alpha_n)*k_{f\alpha} - \dot{\alpha}_n*k_{r\alpha} \quad (11)$$

$$\dot{\alpha}_{n+1} = \dot{\alpha}_n + \ddot{\alpha}_{n+1}*dt \quad (12)$$

$$\alpha_{n+1} = \alpha_n + \dot{\alpha}_{n+1}*dt \quad (13)$$

$$\ddot{\beta}_{n+1} = (\beta_{com_{n+1}} - \beta_n)*k_{f\beta} - \dot{\beta}_n*k_{r\beta} \quad (14)$$

$$\dot{\beta}_{n+1} = \dot{\beta}_n + \ddot{\beta}_{n+1}*dt \quad (15)$$

$$\beta_{n+1} = \beta_n + \dot{\beta}_{n+1}*dt \quad (16)$$

$$\ddot{P}_{n+1} = (P_{com_{n+1}} - P_n)*k_{fp} - \dot{P}_n*k_{rp} \quad (17)$$

$$\dot{P}_{n+1} = \dot{P}_n + \ddot{P}_{n+1}*dt \quad (18)$$

$$P_{n+} = P_n + \dot{P}_{n+1}*dt \quad (19)$$

Next, at a block 194, the simulation application program determines axial velocities and acceleration values at time equals n+1 based on the determined angle of attack, yaw angle, total velocity, and simulation frequency at time equals n+1. See equations 20–25 below:

$$U_{n+1} = Vt_{n+1}*\cos(\alpha_{n+1})*\cos(\beta_{n+1}) \quad (20)$$

$$V_{n+1} = Vt_{n+1}*\sin(\beta_{n+1}) \quad (21)$$

$$W_{n+1} = Vt_{n+1}*\sin(\alpha_{n+1})*\cos(\beta_{n+1}) \quad (22)$$

$$\dot{U}_{n+1} = (U_{n+1} - U_n)*f \quad (23)$$

$$\dot{V}_{n+1} = (V_{n+1} - V_n)*f \quad (24)$$

$$\dot{W}_{n+1} = (W_{n+1} - W_n)*f \quad (25)$$

Figure 4C:
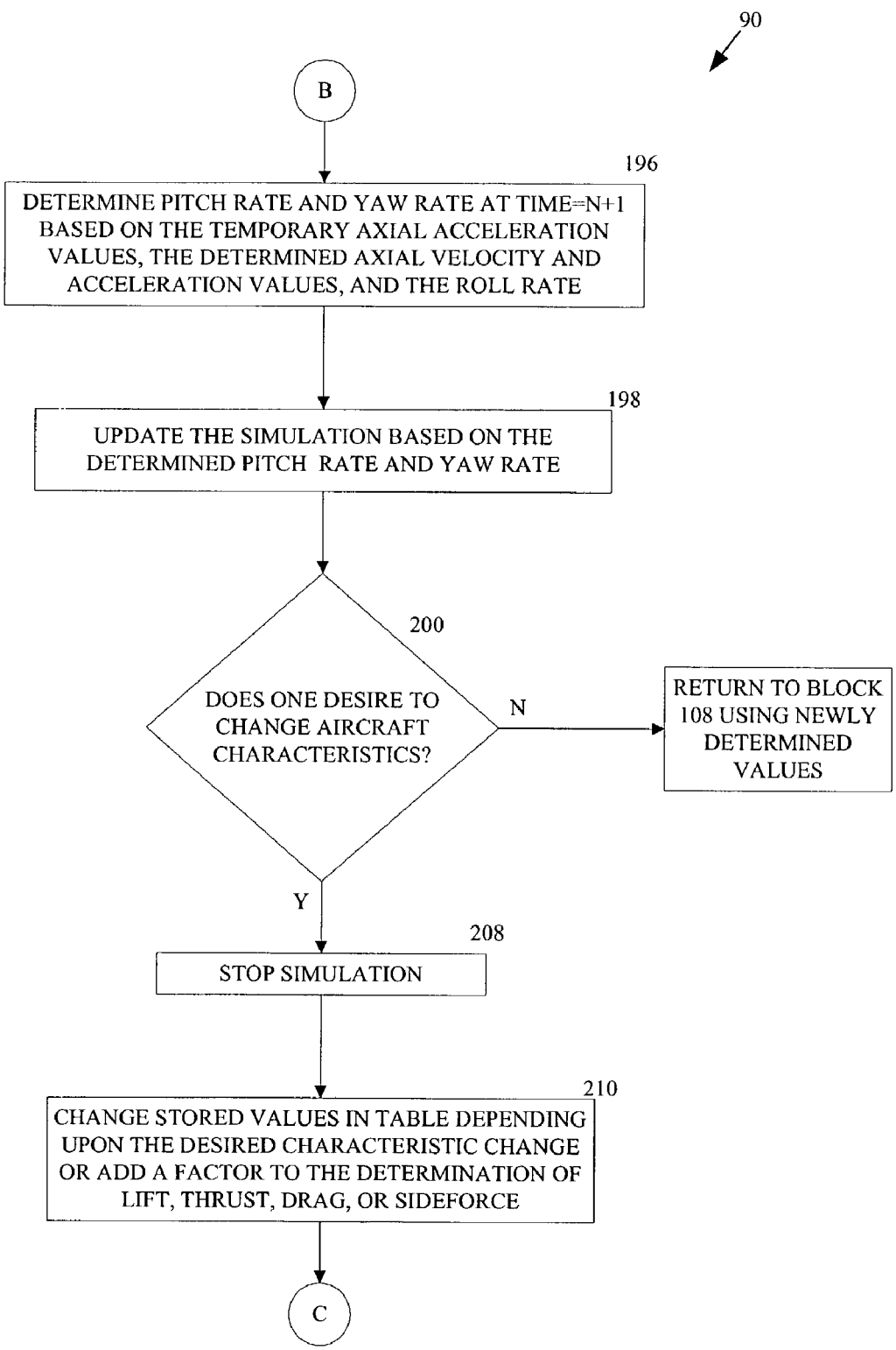

At the block 196 in FIG. 4C, the simulation application program determines the pitch rate (Q) and the yaw rate (R) at time equals n+1 based on determined axial acceleration values, determined axial velocity values, the commanded roll rate value, and the determined temporary axial acceleration values. See equations 26 and 27 below:

$$\dot{Q}_{n+1}=(\dot{W}_{n+1}-Az_{n+1}+P_{n+1}*V_{n+1})/U_{n+1} \quad (26)$$

$$\dot{R}_{n+1}=(-\dot{V}_{n+1}+Ay_{n+1}+P_{n+1}*W_{n+1})/U_{n+1} \quad (27)$$

In order for one to further understand the behavior of the simulation aircraft and fidelity of the simulation, the products of the following equations are used:

$$\dot{Q}_{n+1}=(Q_{n+1}-Q_n)*f \quad (23)$$

$$\dot{R}_{n+1}=(R_{n+1}-R_n)*f \quad (24)$$

At a block 198, the simulation application program updates or generates a new image of the simulation vehicle based on the determined pitch and yaw rate values (Q,R) at time equals n+1. At this point, the simulation application program has completed an update of the simulated aircraft.

If at a decision block 200, the user does not desire to change the aircraft's flight characteristics, the process returns to the block 108 for calculating the next aircraft position using the just calculated values of angle of attack, yaw angle, and roll angle. The flight characteristics include commanded values (angle of attack, yaw angle, and roll rate) and frequency at which the simulation aircraft attains the commanded value.

At the decision block 200, if a user desires to change any flight characteristics of the simulated aircraft, such as commanded values, frequency of attaining a commanded value, or other variables, the simulation for that aircraft is stopped, see a block 208. At a block 210, the user desiring to change the aircraft characteristics changes at least one of the stored values in the tables in the memory 30 associated with commanded angle of attack, yaw angle, and roll rate, values in the table associated with angle of attack frequency, yaw angle frequency, or provides a factor to the determination of Lift, Thrust, Drag, or Sideforce. Then, the user will restart the application program for the aircraft, at block 100 of FIG. 4A, in order to test the changes made to the aircraft's flight characteristics.

In order to make changes to the stored commanded values and frequency values, a user accesses the tables in the memory 30 using the user interface 28 by one of many known methods for database access.

In an alternate embodiment of the present invention, changes are made to stored values in the tables in the memory 30 while the application program continues to operate.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for adjusting a simulated position of a simulated aircraft based on at least one frequency response value for the simulated aircraft in a computer simulation application program, the method comprising:

storing a computer simulation application program in a simulation system that includes a processor;

coupling a user input device to the simulation system;

enabling a user, via the user input device, to generate aircraft control signals for use by the computer simulation application when rendering an image of a simulated aircraft;

coupling a user interface to the simulation system;

storing in a memory of the simulation system at least one characteristic value of the simulation system;

storing in the memory of the simulation system a table of predefined aircraft characteristics for the simulated aircraft operating in the simulated environment, the table of predefined aircraft characteristics remaining constant during operation of the computer simulation application program for the simulated aircraft, the table of predefined aircraft characteristics including frequency response values for pitch, yaw, and roll of the simulated aircraft with associated atmospheric temperature values and atmospheric dynamic pressure values;

receiving an input from the user interface of the simulation system, the input including at least one of a commanded angle of attack, yaw angle, and roll rate;

retrieving at least one frequency response value for pitch, yaw, and roll from the table of predefined aircraft characteristics based on the input from the user interface and the simulated environment providing atmospheric temperature, and atmospheric dynamic pressure values; and adjusting the simulated position of the simulated aircraft using equations of motion based on the retrieved at least one frequency response value for the simulated aircraft and the input received via the user interface of the simulation system.

2. A method for adjusting a simulated position of a simulated aircraft based on at least one of angle of attack, yaw angle, and roll rate for the simulated aircraft in a computer simulation application program, the method comprising:

storing a computer simulation application program in a simulation system that includes a processor;

coupling a user input device to the simulation system;

enabling a user, via the user input device, to generate aircraft control signals for use by the computer simulation application when rendering an image of a simulated aircraft;

coupling a user interface to the simulation system;

storing in a memory of the simulation system at least one characteristic value of the simulation system;

storing in the memory of the simulation system a table of predefined aircraft characteristics for the simulated aircraft operating in the simulated environment, the table of predefined aircraft characteristics remaining constant during operation of the computer simulation application program for the simulated aircraft, the table of predefined aircraft characteristics including commanded angle of attack, yaw angle, and roll rate values with an associated atmospheric temperature value, and atmospheric dynamic pressure value, and at least one of an aileron, rudder, and elevator position value of the simulated aircraft;

receiving an input from the user interface of the simulation system, the input including at least one of a commanded angle of attack, yaw angle, and roll rate;

retrieving at least one of the stored commanded angle of attack, yaw angle, and roll rate values from the table of predefined aircraft characteristics based on the input from the user interface and the simulated environment providing atmospheric temperature, and atmospheric dynamic pressure values; and adjusting the simulated position of the simulated aircraft using equations of motion based on the retrieved at least one of commanded angle of attack, yaw angle, and roll rate values for the simulated aircraft and the input received via the user interface of the simulation system.

3. A system for adjusting a simulated position of a simulated aircraft based on at least one frequency response value for the simulated aircraft in a computer simulation application program, the computer simulation application program stored in the system, the system comprising:

a processor to execute the computer simulation application program;

a user input device that enables a user to generate aircraft control signals for use by the computer simulation application program when rendering an image of a simulated aircraft;

a user interface to store aircraft flight characteristic values in a memory of the simulation system, wherein the memory stores a table of predefined aircraft characteristics for the simulated aircraft, the table of predefined aircraft characteristics remaining constant during operation of the computer simulation application program for the simulated aircraft, the table of predefined aircraft characteristics including frequency response values for pitch, yaw, and roll with associated atmospheric temperature values and atmospheric dynamic pressure values;

a receiver module for receiving an input from the user interface of the simulation system, the input including at least one of a commanded angle of attack, yaw angle, and roll rate;

a module for retrieving at least one frequency response value for pitch, yaw, and roll from the table of predefined aircraft characteristics based on the input from the user interface and the simulated environment providing atmospheric temperature, and atmospheric dynamic pressure values; and a module for adjusting the simulated position of the simulated aircraft using equations of motion based on the retrieved at least one frequency response value for the simulated aircraft and the input received via the user interface of the simulation system.

4. A system for adjusting a simulated position of a simulated aircraft based on at least one of angle of attack, yaw angle, and roll rate for the simulated aircraft in a computer simulation application program, the computer simulation application program stored in the system, the system comprising:

a processor to execute the computer simulation application program;

a user input device that enables a user to generate aircraft control signals for use by the computer simulation application program when rendering an image of a simulated aircraft; and a user interface to store aircraft flight characteristic values in a memory of the simulation system, wherein the memory stores a table of predefined aircraft characteristics for the simulated aircraft operating in the simulated environment, the table of predefined aircraft characteristics remaining constant during operation of the computer simulation application program for the simulated aircraft, the table of predefined aircraft characteristics including commanded angle of attack, yaw angle, and roll rate values with an associated atmospheric temperature value, and atmospheric dynamic pressure value, and at least one of an aileron, rudder, and elevator position value;

a receiver module for receiving an input from the user interface of the simulation system, the input including at least one of a commanded angle of attack, yaw angle, and roll rate;

a module for retrieving at least one of the stored commanded angle of attack, yaw angle, and roll rate values from the table of predefined aircraft characteristics based on the input from the user interface and the simulated environment providing atmospheric temperature, and atmospheric dynamic pressure values; and a module for adjusting the simulated position of the simulated aircraft using equations of motion based on the retrieved at least one of commanded angle of attack, yaw angle, and roll rate values for the simulated aircraft and the input received via the user interface of the simulation system.

5. A computer based method for generating an image of an aircraft in a simulated environment, the method comprising:

storing a computer simulation application program in a simulation system that includes a processor, the computer simulation application program for generating a simulated environment;

storing two tables of predefined aircraft characteristics for the simulated aircraft operating in the simulated environment, the tables of predefined aircraft characteristics remaining constant during operation of the computer simulation application program for the simulated aircraft, a first table of predefined aircraft characteristics including frequency response values for pitch, yaw, and roll of the simulated aircraft with associated atmospheric temperature values and atmospheric dynamic pressure values; and a second table of predefined aircraft characteristics including commanded angle of attack, yaw angle, and roll rate values with an associated atmospheric temperature value, and atmospheric dynamic pressure value, and at least one of an aileron, rudder, and elevator position value of the simulated aircraft;

entering at least one of aileron, rudder, and elevator position values for an aircraft operating in the simulated environment, the at least one of the values entered via a user input device coupled to the simulation system;

providing an atmospheric temperature value and atmospheric dynamic pressure value for the aircraft;

retrieving from the second table of predefined aircraft characteristics at least one of a commanded angle of attack, yaw angle, and roll rate for the aircraft based on the provided atmospheric temperature, and atmospheric dynamic pressure, and the at least provided aileron, rudder, or elevator position values;

retrieving from the first table of predefined aircraft characteristics a frequency response value for at least one of pitch, roll, and yaw for the aircraft based on the provided atmospheric temperature, and atmospheric dynamic pressure; and generating an image of the aircraft based on the retrieved at least one angle of attack, yaw angle, or roll rate, frequency response value for at least one of pitch, roll, and yaw and the provided atmospheric temperature, and atmospheric dynamic pressure.

6. The method of claim 5, further comprising adjusting at least one of the frequency response values for at least one of pitch, roll, or yaw for the aircraft based on the provided atmospheric temperature, and atmospheric dynamic pressure.

7. The method of claim 5, further comprising adjusting at least one of angle of attack, yaw angle, or roll rate for the aircraft based on the provided atmospheric temperature, and atmospheric dynamic pressure, and at least one of the provided aileron, rudder, or elevator position values.

8. A computer based system for generating an image of an aircraft in a simulated environment, the system comprising:
   a means for storing a computer simulation application program in a simulation system that includes a processor, the computer simulation application program for generating a simulated environment;
   means for storing two tables of predefined aircraft characteristics for the simulated aircraft operating in the simulated environment, the tables of predefined aircraft characteristics remaining constant during operation of the computer simulation application program for the simulated aircraft, a first table of predefined aircraft characteristics including frequency response values for pitch, yaw, and roll of the simulated aircraft with associated atmospheric temperature values and atmospheric dynamic pressure values; and
   a second table of predefined aircraft characteristics including commanded angle of attack, yaw angle, and roll rate values with an associated atmospheric temperature value, and atmospheric dynamic pressure value, and at least one of an aileron, rudder, and elevator position value of the simulated aircraft;
   a means for entering at least one of aileron, rudder, and elevator position values for an aircraft operating in the simulated environment, the means being usable by a user to manipulate real-time flight characteristics of the aircraft;
   a means for providing an atmospheric temperature value and atmospheric dynamic pressure value for the aircraft;
   a means for retrieving from the second table of predefined aircraft characteristics at least one of a commanded angle of attack, yaw angle, and roll rate for the aircraft based on the provided atmospheric temperature, and atmospheric dynamic pressure, and the at least provided aileron, rudder, or elevator position values;
   a means for retrieving from the first table of predefined aircraft characteristics a frequency response value for the simulated aircraft for at least one of pitch, roll, and yaw for the aircraft based on the provided atmospheric temperature, and atmospheric dynamic pressure; and
   a means for generating an image of the aircraft based on the retrieved at least one angle of attack, yaw angle, or roll rate, the retrieved frequency response value for at least one of pitch, roll, and yaw and the provided atmospheric temperature, and atmospheric dynamic pressure.

9. The system of claim 8, further comprising a means for adjusting at least one of the frequency response values for at least one of pitch, roll, or yaw for the aircraft based on the provided atmospheric temperature, and atmospheric dynamic pressure.

10. The system of claim 8, further comprising a means for adjusting at least one of angle of attack, yaw angle, or roll rate for the aircraft based on the provided atmospheric temperature, and atmospheric dynamic pressure, and at least one of the provided aileron, rudder, or elevator position values.

* * * * *